July 11, 1939.  E. I. GREEN ET AL  2,165,892
MULTIPLEX TELEMETERING SYSTEM
Filed May 10, 1935  3 Sheets-Sheet 3

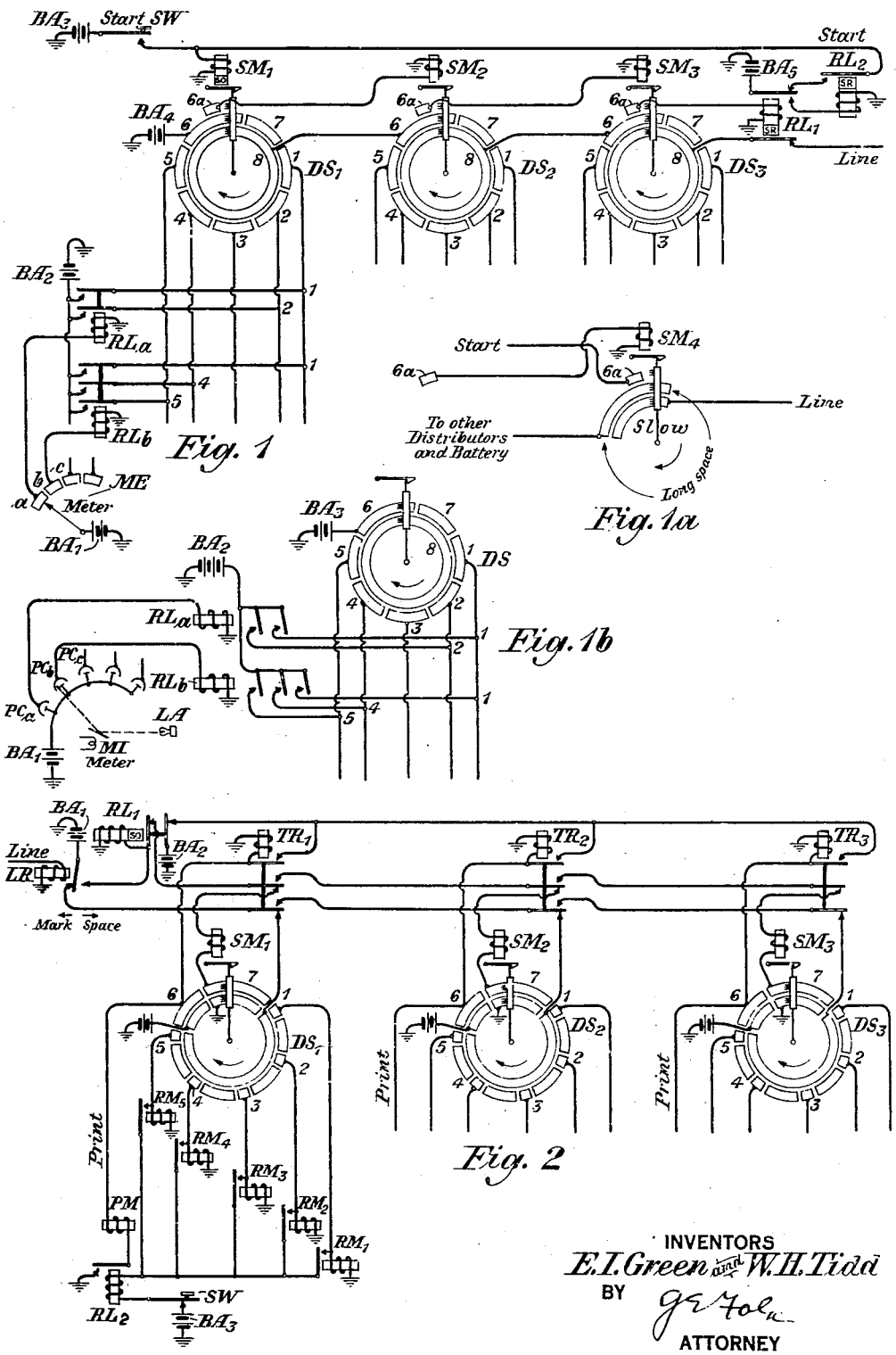

INVENTORS
E. I. Green and W. H. Tidd
BY
ATTORNEY

Patented July 11, 1939

2,165,892

UNITED STATES PATENT OFFICE 2,165,892

MULTIPLEX TELEMETERING SYSTEM

Estill Ibbotson Green, East Orange, N. J., and Warren Hitchcock Tidd, White Plains, N. Y., assignors to American Telephone and Telegraph Company, a corporation of New York Application May 10, 1935, Serial No. 20,864

1 Claim. (Cl. 177—351)

This invention relates to arrangements for indicating at some point, by electrical translating means, the positions of one or more movable elements or the magnitudes of one or more quantities located at a remote point.

It is an object of the invention to provide a system adapted to the remote metering or indicating of such quantities as pressures, levels, positions, voltages, currents, powers, etc.

More particularly, it is an object of this invention to provide a remote metering or indicating system in which it is possible to transmit a number of indications over a single communication channel, as, for example, a telegraph channel.

In accordance with the invention the indications to be transmitted are translated into codes. The codes are then transmitted successively over the channel. The indications are reproduced by receivers which operate in synchronism with the transmitters. Any number of indications may be transmitted by this system over a single channel. Also, transmission may be accomplished over any distance which is a further object of the invention.

These as well as other objects and features of the invention will be more fully understood from the following detailed exposition when read in connection with the accompanying drawings.

Figure 3:
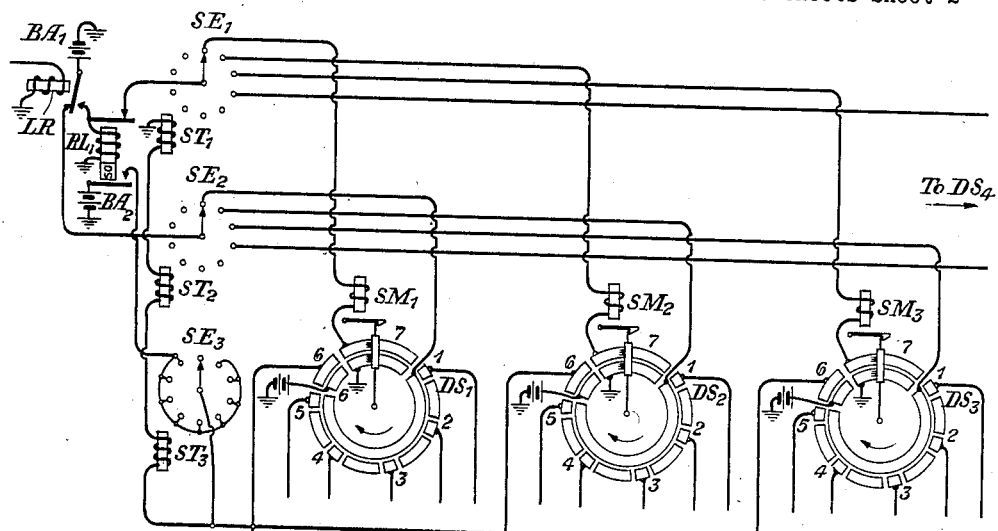
Figure 4:
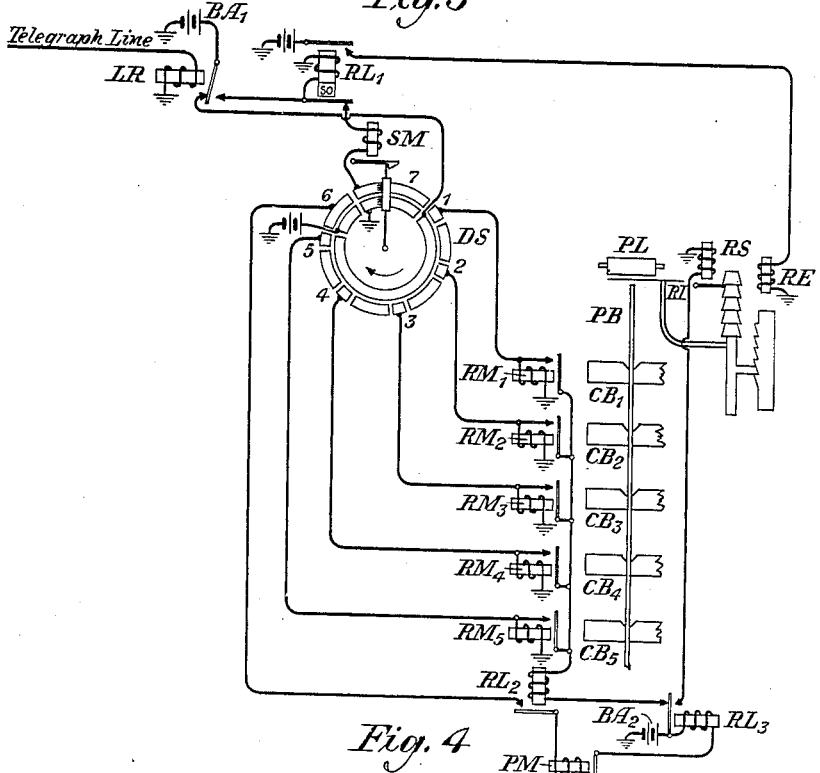
Figure 5:
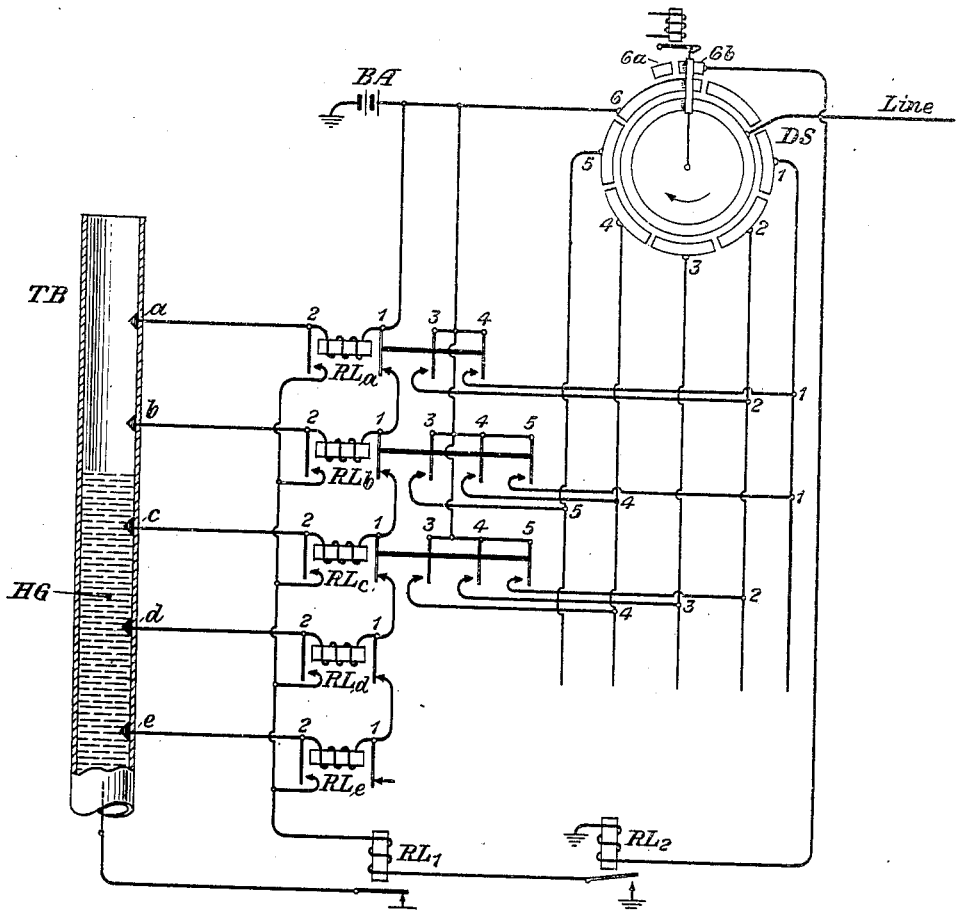
Figure 6:
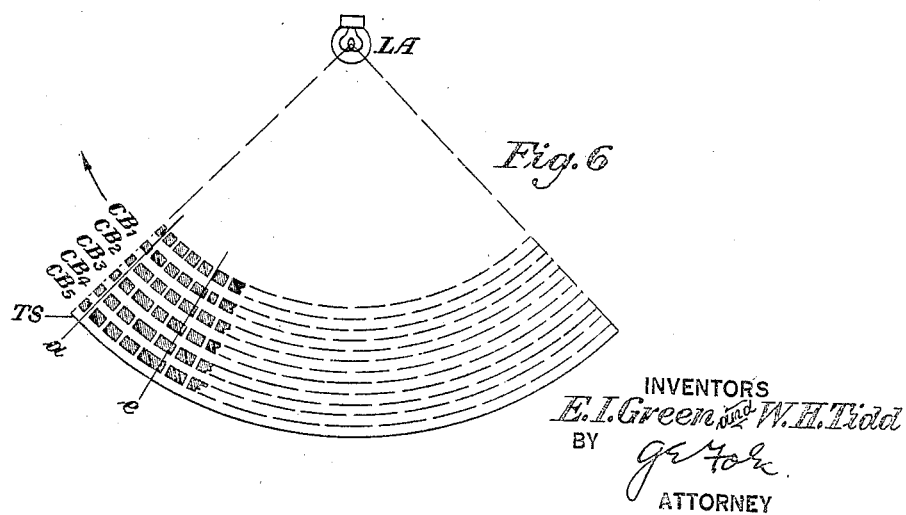

Referring to the drawings, Figure 1 is a transmitting circuit arrangement; Fig. 1a shows an alternative synchronizing arrangement for Fig. 1; Fig. 1b represents an alternative translating arrangement for Fig. 1; Fig. 2 shows a receiving circuit arrangement; Fig. 3 shows another receiving circuit arrangement; Fig. 4 represents a receiving circuit arrangement for recording on paper; Fig. 5 shows a translating device for fluid pressures and levels and Fig. 6 shows a visual receiving indicator.

Referring now to Fig. 1, an arrangement is shown for transmitting three indications over a single telegraph channel. A meter ME is shown having insulated conducting segments, $a$, $b$, $c$, over which the indicating needle swings. Any indicating device actuated by the quantity to be metered may be used in place of this meter. The number of discrete values which may be transmitted may be made as large as is desirable. If the five-unit teletypewriter code is used, the range of the meter may be divided into 32 parts which permits an accuracy of approximately three per cent over the range. The wiping contact on the indicating device is connected to a battery $BA_1$. A relay is connected to each segment of the meter. Battery supplied by the wiping contact to the conducting segment energizes the associated relay. The contacts of each relay are arranged to set up an individual code by supplying battery to some combination of the five distributor code segments. With the indicator in the position shown in Fig. 1 the relay $RL_a$ would be energized and battery from $BA_2$ would be supplied to the segments 1 and 2 of the distributor $DS_1$.

Three distributors are shown in Fig. 1, the movable brush of each held in the initial position by the latches associated with the starting magnets $SM_1$, $SM_2$ and $SM_3$. In this position battery from $BA_4$ is applied to the line through segment 6, the continuous ring 8 of each distributor and the contacts of relay $RL_1$. To initiate the telemetering cycle, and start the system so that it will then continue indefinitely to transmit indications, the start switch SW is closed. This energizes the start magnet $SM_1$, releasing the brush of distributor $DS_1$. This brush is driven by a constant speed motor through a friction clutch which rotates the brush as soon as the latch is operated. In passing over segment 7 the battery circuit to the line is opened, transmitting a spacing signal. Then the segments 1 to 5 are traversed, transmitting marking or spacing signals to the line in accordance with the code set up by the meter ME and relays such as $RL_a$. Battery is permanently connected to segment 6 and thus a long marking signal is transmitted to the line. The brush is stopped on segment 6 by the latch. This completes the transmission of the first indication.

Towards the end of its travel the brush of the first distributor makes contact with an auxiliary segment $6a$ and connects battery from segment 6 to the start magnet $SM_2$ of the second distributor $DS_2$. The associated latch is operated, releasing the brush of this distributor. The operation is the same as that for the first distributor, transmitting to the line first a spacing signal then a code of five units followed by a marking signal. The auxiliary segment $6a$ of the second distributor releases the brush of the third distributor, $DS_3$, and its operation is also the same as set forth in connection with the previously mentioned distributors.

When the brush of the third distributor $DS_3$ passes over its auxiliary segment $6a$, a circuit is completed from the battery $BA_4$ through segments 6 and 8 of all the distributors, and segments $6a$ of $DS_3$, to the relay $RL_1$. This relay is of the fast-operating slow-release type. One contact opens the line circuit. The other closes the circuit from battery BA₅ through relay RL₂ which operates. After an interval which is made longer than the time necessary for one revolution of a distributor brush the relay RL₁ releases, reclosing the line circuit. The other contact on this relay applies battery BA₅ through the contacts of relay RL₂ to the start magnet SM₁. This magnet is slow-acting and relay RL₂ is of the slow-release type so that it will hold up until start magnet SM₁ has operated. The operation of the start magnet SM₁ initiates the cycle again.

In Fig. 1a an alternative arrangement is shown for sending the synchronizing pulses. It consists of a distributor similar to the others except that it revolves more slowly. The auxiliary segment 6a in the last distributor energizes the start magnet SM₄ which releases the brush. During a large part of its revolution the line circuit is held open. This is followed by a long marking signal and near the end of its travel the brush energizes start magnet SM₁, thus initiating the cycle again. The code of pulses for starting the cycle transmitted to the line with this arrangement is the same as with the arrangement shown in Fig. 1, comprising an extra long spacing signal followed by a long marking signal.

Fig. 1b shows a translating arrangement for the transmitting distributors which may be used in place of that shown in Fig. 1. This arrangement may be used where the torque of the meter or other actuating device is small. Photoelectric cells or other light sensitive devices PCₐ, PCᵦ, etc., are arranged in an arc about a small mirror MI. The mirror MI is rotated about a vertical axis proportionally to the magnitude of the quantity to be metered. A beam of light from some source such as the lamp LA strikes the mirror MI and is deflected. When the beam strikes one of the photoelectric cells, current flows from the battery BA₁ through the illuminated photo cell and its associated relay, actuating the relay. The relay contacts are arranged to apply battery from BA₂ to segments of the distributor DS in a code corresponding to the illuminated photo cell, or the value of the quantity being measured.

In Figs. 1, 1a and 1b, and in subsequent figures, brush and segment distributors have been shown. This has been done for convenience in showing the time sequence of operations. It will be understood that any device which can perform the function of closing circuits in a definite time relationship can be used. For example, cam operated switches could be used. Ionic tube distributors might readily be substituted for the distributors shown herein.

The transmission line used with this invention may be any type of telegraph channel, neutral or polar, metallic or grounded, d-c. or voice or high-frequency carrier, or any other. The line may also include repeaters, which may be of any standard type suitable to the type of channel used, or of a simple one-way type since transmission occurs in one direction only.

Referring now to Fig. 2, an arrangement is shown for receiving the transmitted indications in a multiplex telemetering system, the transmission of which has been described in connection with Fig. 1. The incoming line is connected through a line relay LR to ground. The armature of the line relay has an operated or marking position and a released or spacing position. The initial or idle position of the apparatus is as shown in Fig. 2 with all of the relays except the line relay deenergized. In this position the apparatus is prepared to receive properly one complete telemetering cycle.

The first impulse from the transmitter after the start switch has been closed is a spacing signal. The armature of the line relay LR is released and a circuit is completed from the battery BA₁ through the spacing contact of the line relay, one contact of relay RL₁, one contact of the transfer relay TR₁, the start magnet SM₁ and segments 7 of the distributor DS₁ to ground. This energizes the start magnet SM₁ and releases the distributor brush. This brush is driven by a motor through a friction clutch. It may be considered that this brush is rotated at the same speed as that at the transmitter. Actually the receiving distributor should rotate slightly faster to insure positive synchronization.

After the starting pulse, the five code pulses are received in succession as the brush passes over segments 1 to 5. If a marking signal is received one one of these segments, segment 4, for example, the corresponding receiving magnet RM₄ will be energized. When its contact has been made the magnet is locked up since a circuit has been established from battery BA₃ through the switch SW, relay RL₂, the armature and contact of receiving magnet RM₄, its winding and ground. After the code has been received those of the magnets will be energized which correspond to the marking pulses received. It will be seen that as soon as any of the five receiving magnets has been energized the relay RL₂ is energized. This closes a circuit from the printing magnet PM to ground so that it may operate when battery is applied. The printing or register magnet PM is operated when the brush of distributor DS₁ passes over the segments 6. Battery is connected permanently to the inside segment and the brush conducts this to the outside segment to which the printing magnet is connected. This printing magnet registers visually or records graphically the indication corresponding to the received code. After its operation has been completed the switch SW is opened by a cam contact or relay and the receiving magnets are restored to their initial position.

After the printing magnet has been operated the operation for the first indication is complete. The transfer relay TR₁ is operated with the printing magnet. This closes the lockup circuit through its contact and one contact of relay RL₁ to battery BA₂. The other two contacts of the transfer relay TR₁ transfer the spacing and marking contacts of the line relay LR to the second distributor DS₂. This distributor receives the impulses for the second indication and the third distributor DS₃ is connected by the transfer relay TR₂ after distributor DS₂ has finished receiving. When distributor DS₃ has completed its operation the last transfer relay TR₃ is operated. All three distributors have now received their respective indications and all three transfer relays are locked up completing the cycle.

It will now be remembered that the transmitting apparatus sends a long spacing signal. The line relay LR is held in the spacing position long enough to operate relay RL₁. This relay is of the slow acting type so that the shorter spacing signals used for starting and in the code transmission cannot operate it. When it is operated the lock-up circuit through the transfer relays is broken and these are deenergized. The circuit to the distributors is broken at the same time so that distributor DS₁ does not receive a starting pulse. After the long spacing signal a long marking signal follows which allows relay RL₁ to drop back, thus connecting the apparatus in its initial position in readiness to receive as soon as the transmitting apparatus recommences its cycle.

In the above description, only three distributors have been shown but the system may be used with any number of distributors to transmit any number of telemetering indications.

Another possible receiving arrangement is shown in Fig. 3. Synchronism is maintained between the various telemetering transmitters and receivers in this arrangement by means of rotary switches or selectors. The line relay LR receives the pulses from the transmitter over the telegraph line. The marking contact of the line relay is connected directly to the arm of selector SE₂. The spacing contact of the line relay is connected through a contact of relay RL₁ to the arm of selector SE₁. When the start pulse (spacing) is received, battery from BA₁ is connected through the spacing contact of the line relay, a contact of relay RL₁, through selector SE₁, through start magnet SM₁ and segments 7 of the distributor DS₁ to ground. This releases the brush of the distributor. The code signals are received as has been explained before in connection with Fig. 2. On passing segment 6 battery is applied to the printing or registering magnet and the stepping magnets ST₁, ST₂ and ST₃. This moves the arms of the three selectors to the second position, thus connecting distributor DS₂ to receive. The arms of these selectors may be connected together mechanically. This process may be continued through any number of distributors.

In order to insure that the sequence is started off properly each time, the transmitter sends a long spacing signal after completing the transmission of a cycle. This holds the line relay LR in the spacing position long enough to actuate relay RL₁, which is of the slow-acting type. When this relay pulls up the circuit from the spacing contact to selector SE₁ is broken to prevent any false start signals. The other contact of relay RL₁ applies battery to all the contacts of an auxiliary selector SE₃, except the first. If the selector arms are in any but their initial position, the stepping magnets will be energized through this selector. The selectors will thus be successively stepped along until they are in their initial positions. Battery is not connected by relay RL₁ to the initial contact of selector SE₃ so that the selectors come to rest in this position. After the spacing signal a marking signal is transmitted allowing relay RL₁ to release. The circuit is now restored to its initial position and prepared to receive the next telemetering cycle.

The receiving arrangement shown in Fig. 4 may be used to receive and record the indications transmitted by a system such as that described in connection with Fig. 1. In this receiver only one distributor is necessary. The indications are all recorded on the same paper in different colored inks.

Referring now to Fig. 4, the telegraph line terminates in the line relay LR. Its marking contact is connected to the continuous ring of distributor DS. The spacing contact is connected through the contacts of relay RL₁, the start magnet SM and segments 7 of the distributor to ground. When the first starting pulse is received the start magnet SM is energized and the brush of the distributor is released. The receiving magnets RM₁—RM₅ are next set up to correspond to the received code. If, for instance, a marking pulse was received on segment 1 of the distributor, the receiving magnet RM₁ will be energized. Its contact establishes a circuit from ground through its winding, the winding of relay RL₂, a contact of RL₃ and battery BA₂; thus the receiving magnet RM₁ is locked up. Relay RL₂ is energized and its contact establishes a circuit between segment 6 of the distributor to the printing magnet PM. After the five code segments have been passed over the brush closes the circuit through segments 6 applying battery to the printing magnet PM. The brush finally returns to segments 7 where it is stopped by the latch.

The operation of the printing magnet causes the print bar PB which has been selected by the code bars CB₁—CB₅ actuated by the receiving magnets to be operated and print the indication in the proper colored ink on a paper roll over the platen PL. For instance, in Fig. 4, had the second receiving magnet RM₂ been energized, code bar CB₂ would have been shifted to the left. This would have placed its notch in line with those of the other code bars allowing the print bar PB to drop down. This print bar would then have been actuated by the print magnet PM to print the indication on the paper.

The operation of the printing magnet PM also causes a contact associated with it to complete a circuit through the relay RL₃ and battery BA₂. The operation of relay RL₃ opens the lock-up circuit through the receiving magnets and relay RL₂, restoring these to their initial positions. At the same time a circuit is completed through the make contact of relay RL₃ to the ribbon shift magnet RS. The ribbon shift magnet operates a pawl and ratchet arrangement which steps the ribbon RI to its next position, the color of which corresponds to the next indication. Due to the opening of the relay RL₂, the printing magnet PM and relay RL₃ now drop back and the circuit is ready to receive the next indication.

The long spacing signal transmitted for synchronization will operate the slow-acting relay RL. A circuit is completed to the release magnet RE which returns the ribbon to its initial position, thus assuring that the first telemetering indication will be printed on the paper record in its proper color.

Any number of indications may be recorded by using the method of Fig. 4, the only limitation being the confusion of the colored marks on the paper record.

Fig. 5 shows a translating arangement for the transmission of indications of levels and fluid pressures. It may be used with a telemetering system such as that shown in Fig. 1. The pressure or level to be transmitted controls the height of a column of mercury HG in the insulated tube TB. In the side of the tube are arranged contacts, $a, b, c, d, e$, etc. The relays RL$_a$ and RL$_b$, etc., are arranged so that the one connected to the highest contact covered by the mercury column is energized, all of the others being released. The contacts, 3, 4, 5, etc., of the energized relay connect battery to some of the segments 1-5 of the distributor DS so that the proper code is transmitted as has been explained before.

It will be seen from Fig. 5 that battery is supplied to the relays in sequence through their No. 1 contacts, that is, one side of relay RL$_a$ is connected to battery, RL$_b$ is connected to battery through contact 1 of RL$_a$, etc. The column of mercury is connected to ground through the contact of relay RL₁. As shown in Fig. 5 the mercury HG covers all of the contacts up to $c$. Ground is therefore, applied to relay RL$_c$ which energizes it.

This opens the contact No. 1 of relay RLc and prevents battery from being applied to all of the relays below it so that these are all deenergized despite the fact that ground is connected to one side of each through the mercury column. From this it will be seen that only the relay whose contact is nearest the top of the mercury column will be energized.

In order to prevent the operation of relays due to changes in the height of the mercury column during the transmission of a code by the distributor DS, a lock-up feature has been added. When the distributor is idle the brush is held by the latch on segment 6b. Battery thus is applied to relay RL2, holding its contact open. This in turn leaves RL1 deenergized and prevents ground from being applied to RLc through its contact 2. The changes in mercury level will be faithfully followed by the series of relays in this condition. However, when the distributor commences to transmit, its indication relay RL2 is deenergized. Its contact in falling back completes a circuit from battery through contact 1 of the relays above that energized, relay RLc, its contact 2, relay RL1 and ground. RL1 is thus energized and removes the ground from the mercury column so that no other relays will be energized regardless of its level. The last relay energized by the mercury column will remain locked up during the transmission of the five code pulses, assuring that only one code is transmitted. As soon as the distributor returns to its initial position relay RL2 will again be energized through segment 6b. This removes the lockup connection through contact 2 of RLc and restores the ground to the mercury column. In this condition the relays are again free to follow the level changes in the mercury column.

Fig. 6 shows an arrangement which might be used to show visually the received indication for a telemetering system such as has been described. Code bars CB1, CB2, CB3, CB4, CB5 are operated by the receiving mechanism. If a marking signal is received the corresponding code bar is shifted to the left or clockwise a small amount and for spacing signals the position is as shown in Fig. 6. If, for instance, a marking signal were received on segment 1 of the receiving distributor, code bar CB1 would be rotated clockwise a small amount. This would bring the first notch in CB1 into line with those of the remaining code bars, thus permitting light from the lamp LA to shine on the translucent screen TS at the point a. A scale on the screen indicates the value of the indication. Similarly, if marking signals were received on all five segments of the distributor all the code bars would be shifted to the left allowing light to shine on the screen at e.

In the foregoing exposition of some of the possible detailed arrangements for multiplex telemetering by means of coded pulses the start-stop system of synchronizing distributors at the two ends of the circuit has been used. This type of synchronizing utilizes special additional pulses to keep the distributors in step. It would be possible to utilize the code pulses themselves for this purpose as is done in the "multiplex" system of printing telegraphy. Additional pulses would be necessary to insure synchronism only between each complete cycle of transmissions. This is contemplated as part of the invention.

The mechanisms used in this telemetering system, other than those which have been described, are similar to those used in the printing telegraph art. It is not thought necessary to describe and illustrate these devices. This includes such units as the receiving magnets, code bars, printing mechanism, and the mechanical interrelation of the various parts.

Although the invention has been herein described in connection with certain particular embodiments, it will be understood that many modifications, both of circuit arrangement and instrumentalities employed, may be made without departing from the spirit or scope of the invention as set forth in the appended claim.

What is claimed is:

In a telemetering system, a series of start-stop transmitting distributors each having means to translate the continuously changing magnitude of a quantity into characteristic telegraph codes, a transmission line common to said distributors, means controlled by the first distributor of the series and by each succeeding distributor after it transmits its translated code over the transmission line for releasing its immediately succeeding distributor for transmission over said line, delayed action means controlled by the last distributor of the series for releasing the first distributor of the series after a lapse of time longer than that required to release the other distributors to thereby introduce a long pause in the transmission, a series of start-stop receiving distributors associated with said common line, sequence means responsive to said codes for sequentially releasing the distributors for sequential response to the respective codes, means responsive to the long pause in transmission for restoring the sequence means to a condition for invariably causing the release of the first receiving distributor, and separate indicating means associated with each receiving distributor and responsive to its received code.

ESTILL IBBOTSON GREEN.
WARREN HITCHCOCK TIDD.